(12) United States Patent
MacDougall

(10) Patent No.: US 7,458,597 B2
(45) Date of Patent: Dec. 2, 2008

(54) MULTIPLE USE ADJUSTABLE SECURITY TRAILER FOR TRANSPORTATION, STORAGE AND HOUSING

(76) Inventor: Kenneth L. MacDougall, 871 Waverley Road, Waverley, Nova Scotia (CA) B2R 1V7

( * ) Notice: Subject to any disclaimer, the term of this patent is extended or adjusted under 35 U.S.C. 154(b) by 273 days.

(21) Appl. No.: 10/598,570

(22) PCT Filed: Mar. 3, 2005

(86) PCT No.: PCT/CA2005/000329

§ 371 (c)(1),
(2), (4) Date: Sep. 5, 2006

(87) PCT Pub. No.: WO2005/085048

PCT Pub. Date: Sep. 15, 2005

(65) Prior Publication Data

US 2007/0182125 A1 Aug. 9, 2007

(30) Foreign Application Priority Data

Mar. 5, 2004 (CA) .................................. 2460262

(51) Int. Cl.
B60D 1/54 (2006.01)
(52) U.S. Cl. .................... 280/491.1; 280/444; 280/489; 280/491.5; 280/656
(58) Field of Classification Search .............. 280/491.1, 280/444, 489, 491.5
See application file for complete search history.

(56) References Cited

U.S. PATENT DOCUMENTS

| 4,077,643 | A | * | 3/1978 | Bates ...................... 280/43.18 |
| 4,165,096 | A | | 8/1979 | Lewis, Jr. et al. |
| 4,362,316 | A | * | 12/1982 | Wright ....................... 280/656 |
| 4,372,568 | A | | 2/1983 | Campbell |
| 4,511,181 | A | | 4/1985 | Schantz |
| 4,529,220 | A | * | 7/1985 | Wright et al. ............... 280/656 |

(Continued)

FOREIGN PATENT DOCUMENTS

EP 0076475 4/1983

(Continued)

Primary Examiner—Lesley D. Morris
Assistant Examiner—Tashiana Adams
(74) Attorney, Agent, or Firm—Brooks Kushman P.C.

(57) ABSTRACT

The present invention provides a multiple use adjustable trailer for use in transportation, storage and housing, comprising: a substantially Y-shaped tongue (18) which pivots on a frame (2) into a perpendicular position where the lower portions of the side arms of the tongue (18) function as support legs for the frame (2), enabling the frame (2) to store and display materials or house equipment in the trailer bed. The tongue (18) is further secured vertically by hitch pins (8) in brackets (28) on the frame (2) that can be locked in place as a deterrent to theft. Two flip-down legs (30) pivotably mounted on the side of the frame (2) are used as temporary support legs before the lower portions of the side arms of the tongue (18) are fully engaged. The flip-down legs (30) are engaged when a hitch pin (8) is released from a hitch means on each side of the frame (2), enabling each flip-down leg (30) to freely pivot downward to contact the ground. The trailer further consists of a tongue coupler hitch (20), a trailer bed and means support wheels (36) and may also contains side rails for the frame (2) and an equipment cover (32).

15 Claims, 5 Drawing Sheets

U.S. PATENT DOCUMENTS

| | | | | |
|---|---|---|---|---|
| 5,261,215 A | * | 11/1993 | Hartz et al. | 56/11.9 |
| 5,340,145 A | * | 8/1994 | Leib et al. | 280/656 |
| 5,607,176 A | * | 3/1997 | Leib et al. | 280/656 |
| 5,743,541 A | | 4/1998 | Cook | |
| 5,924,836 A | * | 7/1999 | Kelly | 414/482 |
| 6,254,117 B1 | * | 7/2001 | Cross | 280/401 |
| 7,055,848 B1 | * | 6/2006 | James | 280/656 |
| 7,229,090 B2 | * | 6/2007 | Cumbie | 280/491.3 |
| 7,237,791 B1 | * | 7/2007 | Stettler | 280/482 |
| 2005/0104323 A1 | * | 5/2005 | Thurm | 280/491.1 |
| 2006/0220346 A1 | * | 10/2006 | Fulton et al. | 280/493 |

FOREIGN PATENT DOCUMENTS

| | | |
|---|---|---|
| GB | 2351478 | 1/2001 |
| GB | 2361460 | 10/2001 |
| NZ | 205656 | 7/1986 |

* cited by examiner

MULTIPLE USE ADJUSTABLE SECURITY TRAILER FOR TRANSPORTATION, STORAGE AND HOUSING

FIELD OF THE INVENTION

The present invention relates to a towable apparatus for transporting, storing and housing equipment or materials and more particularly to a trailer for transporting materials and later securely storing, displaying or housing these or other functioning equipment or materials when it is detached from a towing motor vehicle.

BACKGROUND OF THE INVENTION

Conventional trailers are useful to transport materials but typically have limited additional utility once this task is complete. Such trailers must typically be unloaded before they are stored away, and the transported materials must also be moved and stored or housed separately. In addition, trailers can require large storage space between uses due to their various bulky and awkward configurations. While the prior art has developed trailer structures that can be manipulated into a variety of configurations in order to minimize the storage space required when they are not in use, the steps required to convert such trailers from the transportation to storage modes can be complicated and time-consuming. The sole benefit of the storage mode configuration is typically the minimization of the volume of storage space required and the other disadvantages are not addressed by this remedy. For example, the trailer storage mode configuration is often unstable and unbalanced, creating a potential danger to those near the stored trailer in a garage or other high traffic storage space in the event it is accidentally jarred or shifted. As well, the storage mode often results in the wheels and undercarriage of the trailer projecting outward, creating potentially sharp and/or dirty hazards to nearby individuals.

For example, previous systems have included vertically storable trailers with no function in the storage mode as shown in Canadian Patent No. 1,173,475 ("Luggage and Accessory Trailer"), U.S. Pat. No. 4,511,181 ("Tilt Bed Vertical Storage Utility Trailer"), and U.S. Pat. No. 5,743,541 ("Stowable Utility Trailer"). Other systems have included trailers that are heavy and awkward to move when in the storage mode as shown in U.S. Pat. No. 4,165,096 ("Storable Utility Trailer").

SUMMARY OF THE INVENTION

The present invention overcomes the problems of the prior art by providing a multiple use adjustable trailer which can be utilized in transportation, storage and housing modes.

It is an object of the present invention to provide a trailer that can be simply, easily and quickly converted from its transportation mode into a storage/housing configuration.

Another object of the present invention provides a trailer that is stable, safe, clean and secure when converted to its storage/housing mode.

A further object of the present invention is to provide a trailer that houses functioning equipment such as portable electric generators, welding tanks, water pumps, and radar speed indicators and the like securely within the trailer while it is in its storage/housing mode.

A further object of the present invention is to provide a trailer that stores and displays objects such as tires, firewood, fruit stand produce and the like securely within the trailer while it is in its storage/housing mode.

Accordingly, the present invention provides a towable trailer for transporting and storing equipment or materials, comprising a wheel-mounted trailer frame for housing equipment or materials; a substantially "Y"-shaped tongue having a pair of side arms pivotably mounted to each side of the frame and a front tow bar with forward hitch means; and a pair of flip-down legs affixed one each side of the trailer frame and proportioned to contact a ground surface when in a flip-down position; said tongue being pivotable between a lowered position for transport of the trailer and a vertical secured position for storage of the trailer and/or storage or display of materials or equipment thereon; whereby, in the lowered position, said forward hitch means is connectable to a towing vehicle, while in the vertical position, lower portions of the side arms of the tongue are capable of contacting a ground surface to support the trailer for storage, housing or display of materials or equipment, such as operational equipment, thereon, and said flip-down legs are capable, in the flip-down position, of supporting the trailer frame during pivoting of said tongue.

Another aspect of the present invention provides a method of converting the trailer from a transportation mode into a storage/housing mode, wherein the front tow bar with forward hitch means is disconnected from the tow vehicle; the hitch pin inserted in the flip-down leg hitch means is removed, enabling the flip-down leg to pivot downward into a vertical position about the pivot means thereby contacting the ground and vertically supporting the frame; the front tow bar of the tongue is pivoted upward and the lower portions of the side arms of the tongue are pivoted downward about the pivot means into a near-vertical position, a foot plate is removed from its storage location inside the end of each side arm of the tongue and affixed to the end of each side arm to form a ground support base; the tongue is pivoted into a fully vertical position perpendicular to the frame about the pivot means, thereby engaging the lower portions of the side arms as support legs and vertically supporting the frame; and the vertically extended side arms of the tongue are secured in the fully vertical position by inserting the hitch pin into a vertical hitch means at the upper portion of each side arm and fastening the pin with a locking device or other fastener.

Additional objects and advantages will become apparent from a careful reading of the detailed description provided herein, with appropriate reference to the accompanying drawings.

BRIEF DESCRIPTION OF THE DRAWINGS

Embodiments of the invention will be described below with reference to the accompanying drawings, in which.

DETAILED DESCRIPTION OF THE PREFERRED EMBODIMENTS

Figure 1:
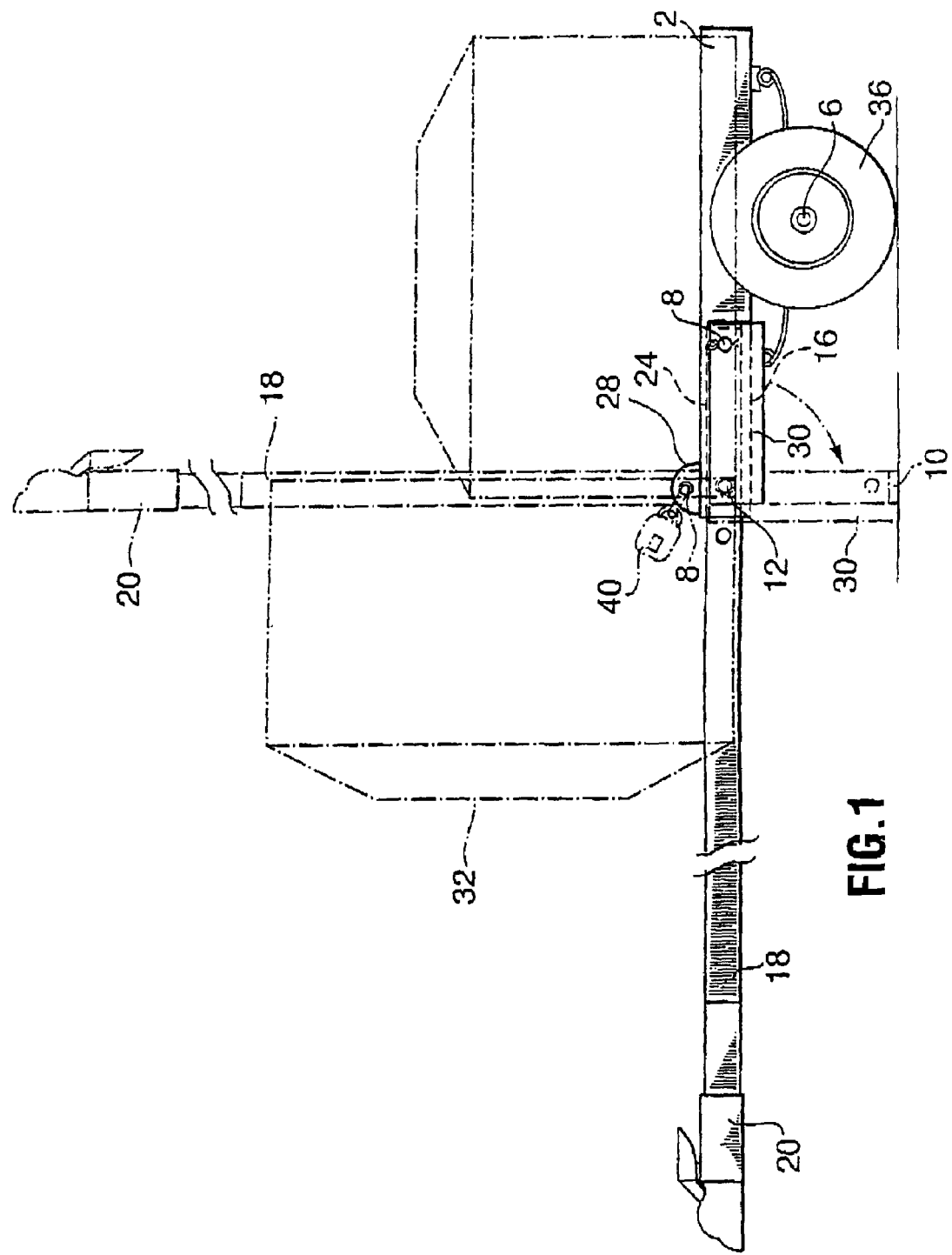
FIG. 1 is a side view of a trailer with equipment cover according to one embodiment of the present invention in its transportation mode and view of its storage/housing mode.
Figure 2:
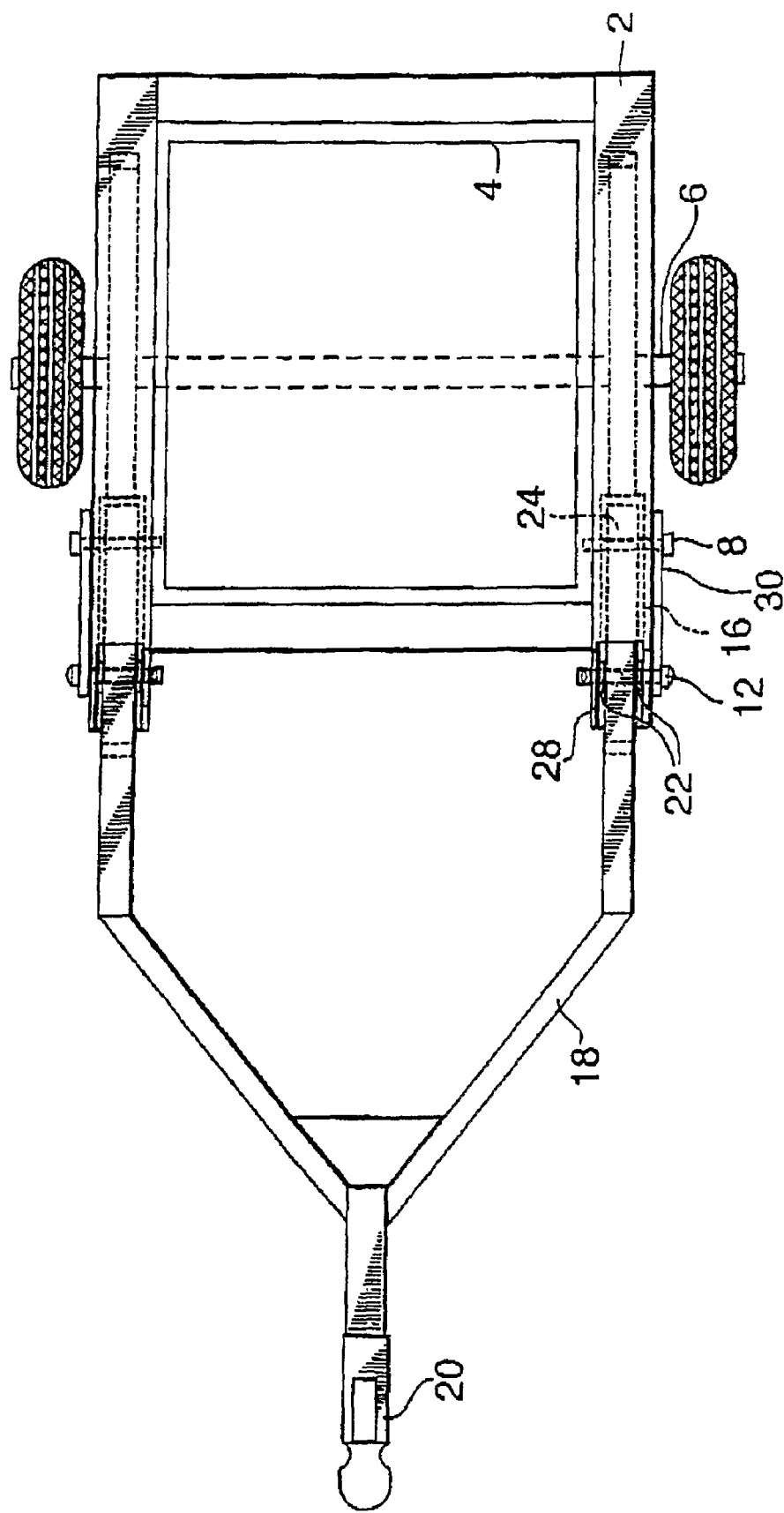
FIG. 2 is a top view of a trailer transporting a box in its transportation mode.
Figure 3:
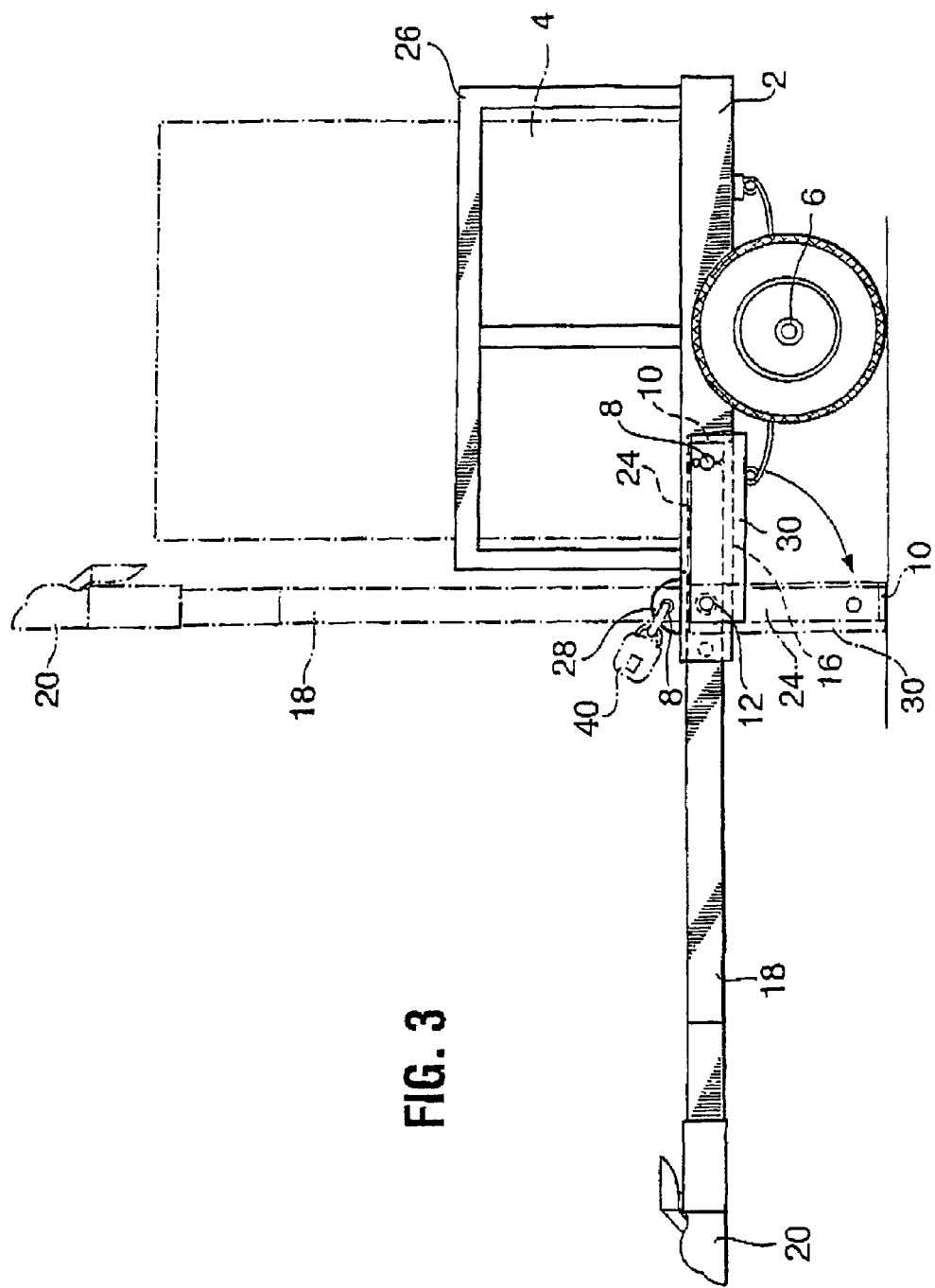
FIG. 3 is a side view of a trailer with rails transporting a box in its transportation mode and view of its storage/housing mode.

Referring to FIGS. 1, 2 and 3, a trailer preferably consists of a two piece metal base support, wherein a front piece is a Y-shaped tongue (18) which inserts into a rear rectangular frame (2). The Y-shaped tongue (18) consists of a front tow bar and two side arms each of which extends outward and to the rear in the same plane with the front tow bar. Each side arm extends back in two segments, wherein the first segment extends outward and to the rear from the front tow bar at an angle which is greater than perpendicular to, but less than parallel to, the front tow bar (i.e., 91 to 179 degrees). The second segment extends directly rearward from the first segment at an angle parallel to the front tow bar (i.e., 180 degrees). The Y-shaped tongue (18) has a rectangular hollow cross-section throughout and is constructed of metal or other suitable material. The side arms are each inserted into the front of a corresponding side of the frame (2) where they are secured while the trailer is in transportation mode by a pivot pin (12) in a pivot means and by a hitch pin (8) in a hitch means. Each side arm has holes capable of inserting the pivot pin (12) and the hitch pin (8).

The rear portion of the frame (2) consists of a connector cross beam attached perpendicularly to the side of the frame at both ends in the same plane to create a stable rectangular frame such that the sides of the frame do not extend rearwardly beyond the rear connector cross beam.

Figure 5:
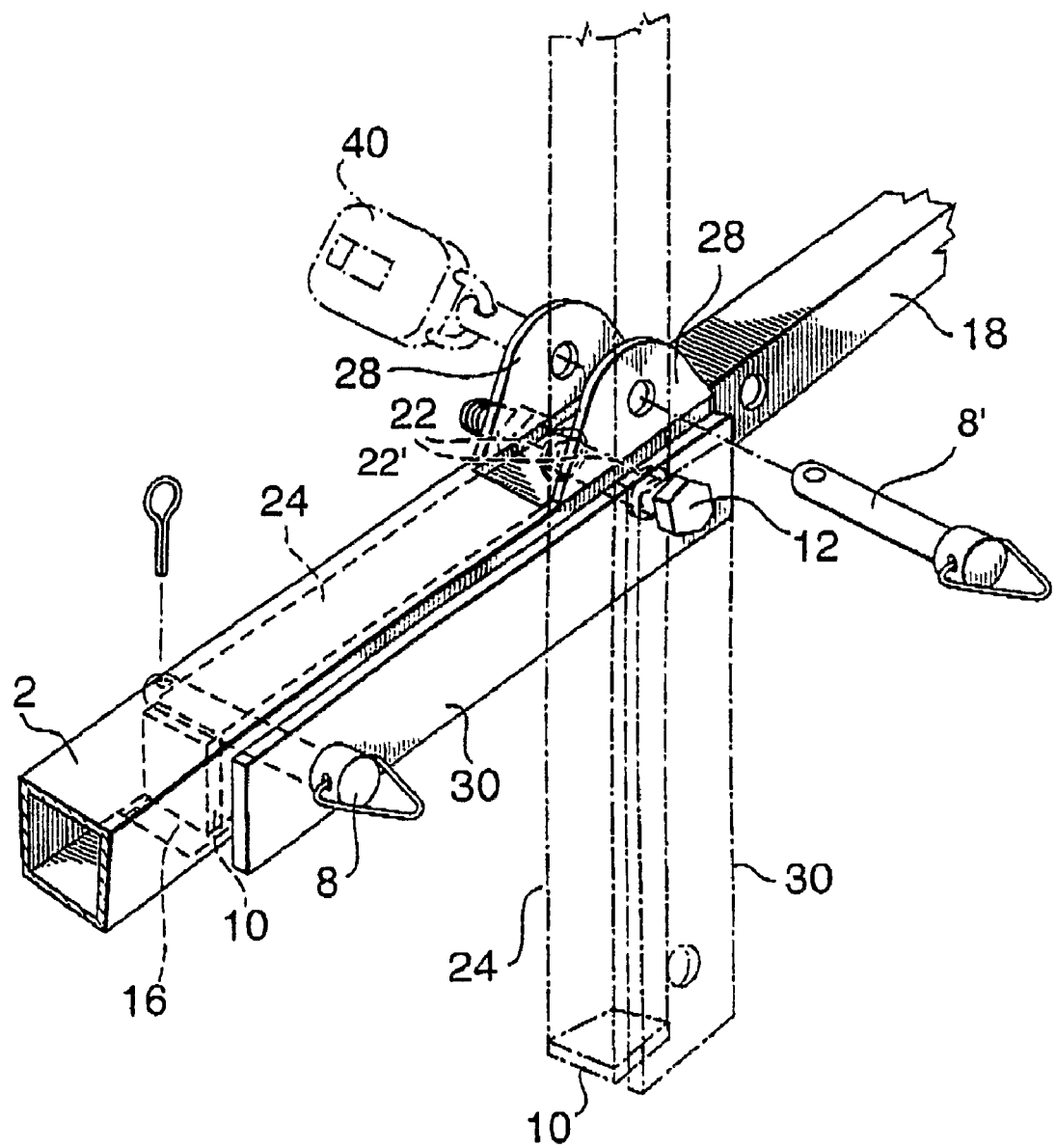
FIG. 5 is a magnified view of a pivot means and a hitch means on a trailer in its transportation mode and view of its storage/housing mode.

Referring now to FIG. 5, a pivot means, a flip-down hitch means and a vertical hitch pin means are mounted to each side of the frame (2) in order to enable the trailer to convert to a storage/housing mode. When the hitch pin (8) is removed from the hitch means, a flip-down leg (30) pivots downward on the pivot means into a vertical position to engage the ground and support the frame. The lower portion of the side arm of the Y-shaped tongue (18) then pivots downward through the open underside of the frame (16), a foot plate (10) is secured to an end of the side arm as a support base, and the side arm pivots fully downward into the vertical position, contacting the ground surface to support the trailer frame. The upper portions of the side arms pivot upward through the open upperside of the frame and are secured above the pivot means at the vertical hitch pin means by inserting the hitch pin (8) in the vertical hitch pin bracket (28) and fastening it with a fastener such as cotter pin or presto pin or with a locking device (40) for additional stability, security and theft deterrence.

Referring now to FIGS. 1 and 3, while the trailer is in transportation mode, the flip-down leg (30) is affixed to each side of the frame (2) at the pivot means and at the flip-down hitch means. At the pivot means, a pivot pin (12) is inserted into a hole aligned through a front part of the flip-down leg (30), the exterior wall of the side of the frame (2), a washer (22), the side arm of the tongue (18), a second washer (22'), and an interior wall of the side of the frame (2) and is secured with a fastener such as a lock nut, a cotter pin or a presto pin. At the flip-down hitch means, a hitch pin (8) is inserted through a hole aligned through an exterior rearward wall of the flip-down leg (30), an exterior wall of the side of the frame (2), the engaged side arm of the tongue (18), and into an interior wall of the side of the frame (2) and is secured with a fastener such as a cotter pin or presto pin. A female trailer coupler hitch (20) is affixed at the tongue front tow bar (18) to permit a towing vehicle to attach to the tongue with a complementary male trailer coupler hitch and tow the trailer while it is in transportation mode.

Figure 4:
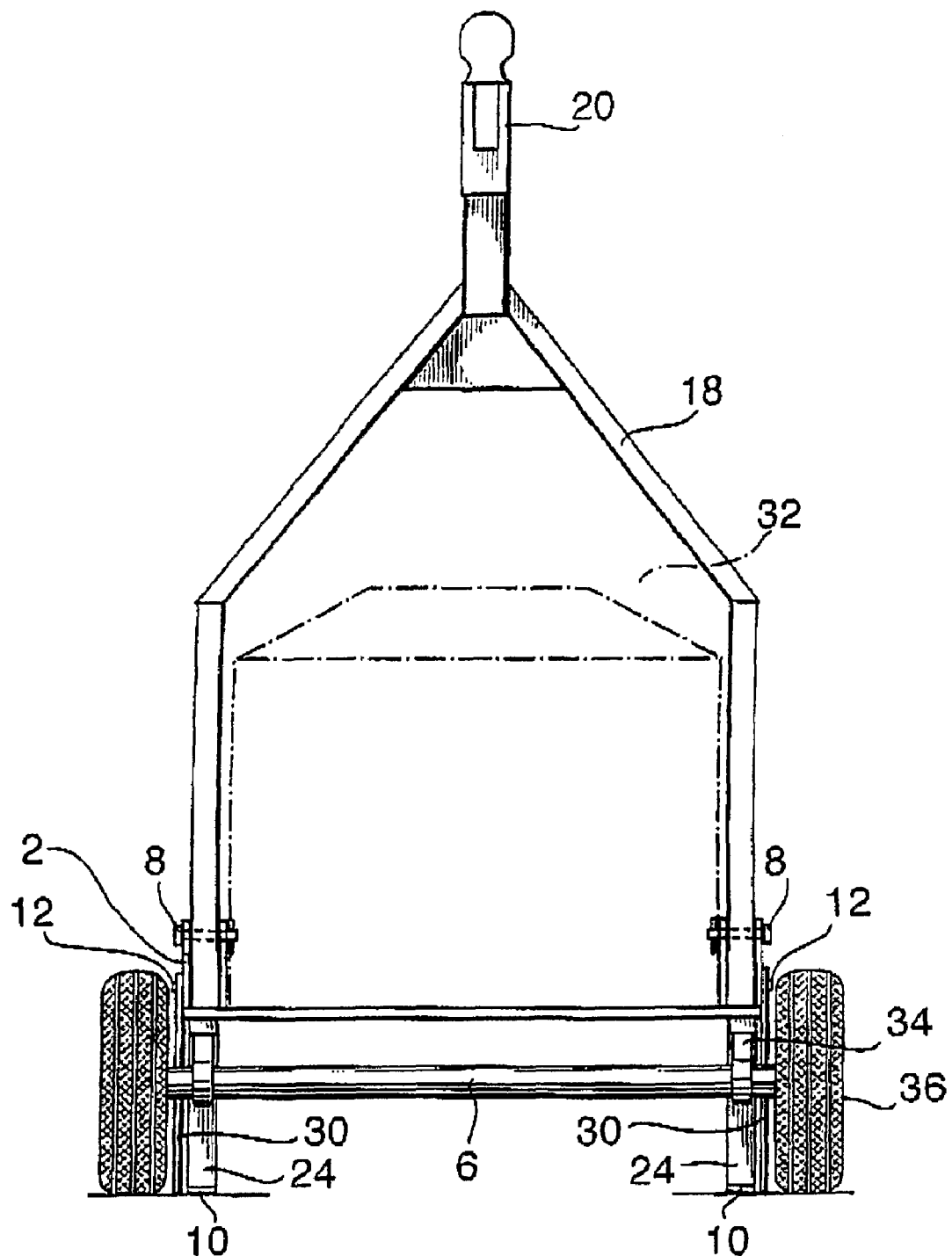
FIG. 4 is a rear view of the trailer in FIG. 1 in its storage/housing mode.

Referring now to FIG. 4, the frame is further equipped with a housing to insert a wheel axle (6) for two tires (36) and to insert springs (34).

Referring now to FIGS. 3 and 4, the sides of the frame can be modified with rails (26) to form walls on the bed capable of securing materials transported by the trailer such as a box (4). An equipment cover (32) capable of pivoting from open to closed positions can also be attached to the pivot point of the trailer in order to protect materials or objects such as portable electric generators, welding tanks, water pumps, tires, firewood, fruit stand produce and the like within the trailer while it is in either transportation or storage/housing mode as shown in FIGS. 1 and 4.

The trailer can be converted from transportation mode to storage/housing mode as follows:

1) the trailer coupler hitch (20) is detached from the towing vehicle;
2) the hitch pin (8) on each side of the trailer is removed from the flip-down leg (30); enabling the rear portion of the flip-down leg to pivot downward into a position perpendicular to the side of the frame (2) to contact the ground surface and support the trailer;
3) the Y-shaped tongue (18) is pivoted upward into a near-vertical position;
4) each foot plate (10) is removed from its storage/housing location inside the end of the side arm of the Y-shaped tongue (18) and affixed to the end to form a support base for each support leg (24);
5) the Y-shaped tongue (18) is pivoted into a fully vertical position perpendicular to the side of the frame (2);
6) the side arms of the tongue are secured to the frame by inserting the hitch pin (8) into the vertical hitch pin bracket (28) above the pivot means and fastening it with a locking device (40) or other fastener.

While the present invention has been described with particular reference to the preferred embodiments, the protection sought is to be limited only by the terms of the claims that follow.

INDUSTRIAL APPLICABILITY

The multiple use adjustable trailer which can be utilized in transportation, storage and housing modes. The trailer of the present invention can be simply, easily and quickly converted from its transportation mode into a storage/housing configuration. In the storage/housing mode the trailer can store and display objects such as tires, firewood, fruit stand produce and the like securely within the trailer.

The invention claimed is:

1. A towable trailer for transporting, storing and housing equipment or materials, comprising a wheel-mounted trailer frame for housing equipment or materials;
   a substantially "Y"-shaped tongue having a pair of side arms pivotably mounted to each side of the frame and a front tow bar with forward hitch means; and
   a pair of flip-down legs affixed one each side of the trailer frame and proportioned to contact a ground surface when in a flip-down position;
   said tongue being pivotable between a lowered position for transport of the trailer and a vertical secured position for storage of the trailer or storage or display of materials or equipment thereon;
   whereby, in the lowered position, said forward hitch means is connectable to a towing vehicle, while in the vertical position, lower portions of the side arms of the tongue are capable of contacting a ground surface to support the trailer for storage, housing or display of materials or equipment thereon, and said flip-down legs are capable, in the flip-down position, of supporting the trailer frame during pivoting of said tongue.

2. The trailer according to claim 1, wherein each of the two side arms of the tongue comprises two segments, a first segment of each arm affixed to and extending laterally rearward from the front tow bar at an angle greater than perpendicular to but less than parallel with the tow bar, and a second segment of each arm extending laterally rearwardly from the first segment and parallel with the tow bar and forming one of the side arms of the tongue.

3. The trailer according to claim 1, wherein the trailer frame is provided with side rails.

4. The trailer according to claim 1, wherein a connector cross beam is attached perpendicularly to the side of the frame at both ends in the same plane to create a stable rectangular frame such that the sides of the frame do not extend rearwardly beyond the connector cross beam.

5. The trailer according to claim 1, wherein an underside and an upperside of each side of the frame are open, enabling the lower portion of each side arm of the tongue to disengage and freely pivot vertically through the frame.

6. The trailer according to claim 1 wherein a pivot means mounted to each side of the frame comprises a pivot pin removably inserted laterally through aligned holes in each of a front part of the flip-down leg, the exterior wall of the side of the frame, a washer, the side arm of the tongue, a second washer, and an interior wall of the side of the frame and is secured with a fastener such as a lock nut or cotter pin.

7. The trailer according to claim 1 wherein each flip-down leg is affixed laterally to an exterior wall of the side of the frame by the pivot means and by a flip-down leg hitch means.

8. The trailer according to claim 7, wherein the flip-down leg hitch means comprises a hitch pin removably inserted laterally through aligned holes in each of an exterior rearward part of a flip-down leg, an exterior wall of the side of the frame, the engaged side arm of the tongue, and an interior wall of the side of the frame and is secured with a fastener such as a cotter pin, presto pin, or the like.

9. The trailer according to claim 1, wherein a vertical hitch means capable of vertically securing the upper portion of the tongue while the trailer is in a storage/housing comprises a hitch pin removably inserted laterally through aligned holes in each of a vertical hitch pin bracket extending from the exterior side of the frame, an upper portion of the vertically extended side arm of the tongue, and a vertical hitch pin bracket extending from the interior side of the frame and is secured with a fastener such as a cotter pin, presto pin, or the like.

10. The trailer according to claim 9, wherein the fastener for the hitch pin inserted into the vertical hitch pin bracket is a locking device such as a padlock that provides stability and acts as a deterrent to theft.

11. The trailer according to claim 1, wherein a removable foot plate is affixed to the end of each side arm of the tongue for use as a ground support base when the arm pivots downward to support the trailer and is capable of insertion into the frame for storage when not in use.

12. The trailer according to claim 1, wherein the trailer frame is provided with suspension springs.

13. The trailer according to claim 1, wherein the trailer frame is provided with an equipment cover capable of pivoting from open to closed positions and attached to the pivot point of the trailer.

14. A method for converting a trailer from a transportation mode into a storage/housing mode, said trailer having a frame; a substantially Y-shaped tongue having a pair of side arms pivotably mounted to each side of the frame and a front tow bar with forward hitch means; a pair of flip-down legs each leg being affixed laterally to the frame by pivot means and a hitch pin inserted through a flip-down leg hitch means; a foot plate; and a vertical hitch means at an upper portion of the side arm and adapted to be connected to a tow vehicle, said method comprising the steps of:

disconnecting the front tow bar with the forward hitch means from the tow vehicle;

removing the hitch pin from the flip-down leg hitch means, enabling the flip-down leg to pivot downward about the pivot means into a substantially vertical position thereby contacting a ground surface and vertically supporting the frame;

pivoting the front tow bar of the tongue upward and pivoting lower portions of the side arms of the tongue downward about a pivot means into a substantially vertical position;

pivoting the tongue into a substantially vertical position perpendicular to the frame about the pivot means, thereby engaging the lower portions of the side arms as support legs and vertically supporting the frame; and securing the side arms of the tongue in the substantially vertical position by inserting the hitch pin into the vertical hitch means.

15. The method according to claim 14, wherein the hitch pin positioned in the vertical hitch means is locked with a locking device.

\* \* \* \* \*